United States Patent [19]

Gumbinner et al.

[11] 3,935,080

[45] Jan. 27, 1976

[54] METHOD OF PRODUCING AN ALUMINUM BASE SHEET FOR A PRINTING PLATE

[75] Inventors: Robert Gumbinner, Tarrytown; Ken-ichi Shimazu, Pleasantville, both of N.Y.

[73] Assignee: Polychrome Corporation, Yonkers, N.Y.

[22] Filed: Oct. 2, 1974

[21] Appl. No.: 511,344

[52] U.S. Cl. .................. 204/28; 204/33; 204/129.1; 204/129.75

[51] Int. Cl.$^{2}$.... C25D 5/00; C25D 5/44; B23P 1/00

[58] Field of Search ......... 204/27, 28, 33, 17, 38 A, 204/129.1, 129.75

[56] References Cited

UNITED STATES PATENTS

| | | | |
|---|---|---|---|
| 3,041,259 | 6/1962 | Stoddard | 204/33 X |
| 3,072,546 | 1/1963 | Wruck | 204/33 UX |
| 3,073,765 | 1/1963 | Adams | 204/33 UX |
| 3,632,486 | 1/1972 | Herrmann | 204/33 |
| 3,650,910 | 3/1972 | Froman | 204/28 |
| 3,691,030 | 9/1972 | Stroszynski | 204/32 R |
| 3,718,547 | 2/1973 | Cooke et al. | 204/28 |
| 3,779,877 | 12/1973 | Alwitt | 204/129.75 |

*Primary Examiner*—John H. Mack
*Assistant Examiner*—Aaron Weisstuch

[57] ABSTRACT

A method of producing an aluminum base sheet for printing plates is shown. The improvement comprises three steps in sequence including electrolytically graining the surface of the aluminum sheet by exposing it to a chemical etching bath comprising a chloride containing electrolytic solution and impressing a current on the sheet; thereafter cathodically cleaning the grained sheet by exposing it to a concentrated solution of sulfuric acid and again impressing a current on the sheet; and finally anodizing the cathodically cleaned sheet by exposing it to a second concentrated solution of sulfuric acid and imposing a current on the sheet. In the preferred embodiment, the electrolytic graining is carried out in the presence of hydrochloric acid and in an alternating current; and the cathodic cleaning and anodizing steps are carried out in sulfuric acid and in a direct current. In the preferred embodiment of the invention a web of aluminum is continuously moved through three treating baths in series.

5 Claims, 1 Drawing Figure

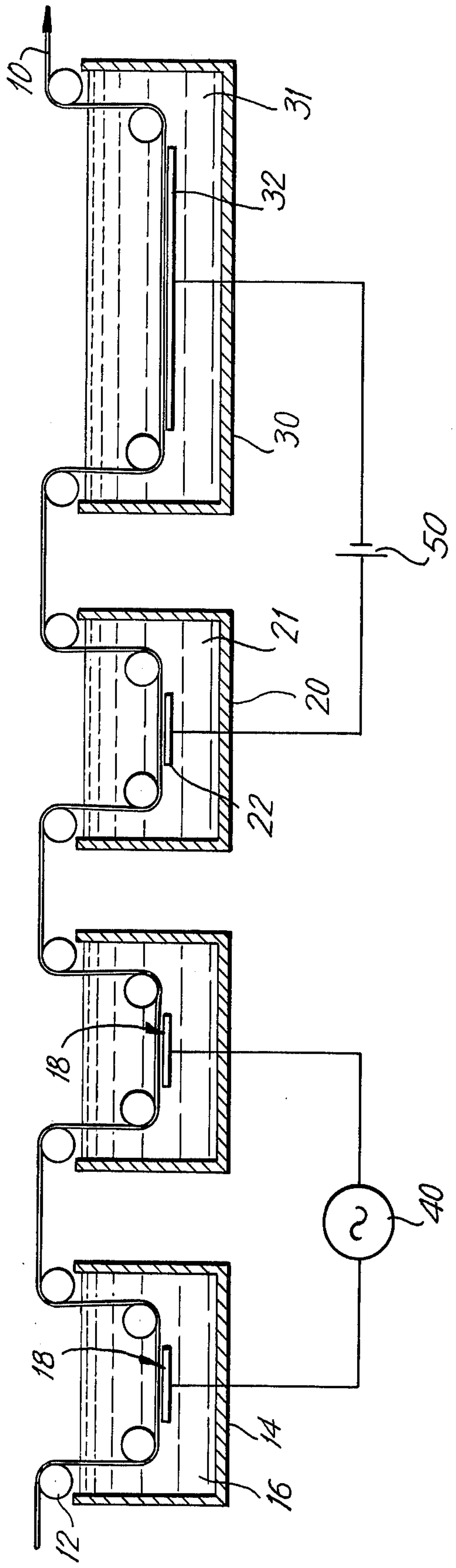
10
31
32
30
50
21
20
22
18
40
18
14
16
12

METHOD OF PRODUCING AN ALUMINUM BASE SHEET FOR A PRINTING PLATE

This invention relates to printing plates, and more particularly to the making of improved aluminum bases for offset, dry-offset, relief and letterpress printing plates.

Offset printing plates, particularly planographic printing plates, require a distinctly hydrophilic character on their surface so that the surface in non-image printing areas of the plates is well-dampened by water or fountain solution and is sufficiently hydrophilic to repel greasy printing ink. Typically, such a surface character on an aluminum base sheet of such a plate is accomplished by mechanical or chemical graining, electrolysis or by etching or anodizing. Those treatments also serve to provide a roughened and porous surface that provides mechanical "tooth" which results in better anchorage and adherence of oleophilic image printing areas on the base sheet.

Letterpress printing plates, which are commonly made of casting metal with photo-sensitive polymeric materials thereon, require that the base of the printing plate have sufficient strength and elasticity to be wrapped around the cylinder of a letterpress. The base should have a surface which is capable of bonding the photopolymer material to the base, and adequate strength to withstand the impact of repeated printing forces. By virtue of its dimensional stability and flexibility, aluminum is most desirable for this type of application. One drawback of aluminum for this purpose, however, is the inadequate bonding that exists between the photopolymer and the aluminum surface. Without some form of treatment, therefore, such as using a phenol-formaldehyde resin as a bonding layer, the bonding is not satisfactory.

In general it is desirable that aluminum sheets intended as bases for planographic offset printing plates be processed, as by graining, to increase the surface area of the raw aluminum in the order of about two to about five times to achieve an ample hydrophilic characteristic and mechanical tooth. For elevated image plates, which may be used without water in dry offset printing, and for letterpress plates, mechanical tooth becomes the more important factor because of the greater mass of material on the base in the image printing area that must be firmly anchored to the base for prolonged presslife. The increase of surface area of the raw aluminum base sheet for such plates should be in excess of five times and desirably is about 7 to 20 times.

Etching of aluminum sheets by ball graining increases the surface area of raw aluminum in the order of about five times. The disadvantages of ball graining, however, are that one-half hour or longer is required and ball graining cannot feasibly be done continuously. Brush graining, which increases the surface area of the raw aluminum sheet about two and one-half times in less time and with continuous processing, is therefore commonly employed. Chemical graining and anodizing methods produce similar results. Such graining and anodizing techniques are disclosed in U.S. Pat. Nos. 2,882,153; 2,882,154 and 3,440,050

In preparing the aluminum sheet for use as a printing plate, it is desirable to clean the surface of the plate and to grain it as well. It is also desirable to harden the surface of the sheet after the plate has been grained so that satisfactory bonding is obtained between the plate and the photosensive polymeric material.

It is thus a primary object of this invention to provide a continuous process for the treatment of aluminum sheet for use as printing plate backing.

It is a further object of this invention to provide a unified process for the graining, cleaning and anodizing of the aluminum plate which minimizes the time required for the treatment and the expense related thereto.

It is still a further object of this invention to provide a process for electrolytically graining the aluminum sheet and thereafter cleaning it, prior to hardening the surface thereof by anodizing.

It is still a further object of this invention to provide a thorough cleaning of the plate after it has been subjected to an etching bath for providing a grain.

These and other objects of this invention are achieved in a three step process comprising the steps of:

1. electrolytically graining the surface of the aluminum base sheet by exposing it to a chemical etching bath which comprises a chloride containing electrolytic solution;
2. thereafter cathodically cleaning the grained sheet by exposing it to a concentrated solution of sulfuric acid; and
3. thereafter anodizing the cathodically cleaned sheet by exposing it to a concentrated solution of sulfuric acid.

In the electrolytic graining step, the sheet has a current density of from 0.1 to 10 amperes per square inch of sheet imposed upon it and the chemical etching bath is maintained at a temperature of broadly from 20° to 95°C. In the cathodic cleaning step the current density is from 0.1 to 10 amperes per square inch of sheet and the bath is maintained at a temperature of about 20° to 80°C. Similarly, during the anodizing step, the cathodically cleaned sheet has a current density of 1 to 100 amperes per square foot impressed upon it and the concentrated solution of sulfuric acid in which it is anodized is maintained at a temperature of from 20° to 80°C. The concentrated aqueous solutions of sulfuric acid used in the cathodic cleaning and in the anodizing steps are approximately 5 to 50% by weight sulfuric acid.

During the chemical graining step, the aluminum surface is etched by reaction with the chloride containing electrolyte and the surface area is substantially increased. Depending upon the degree of etching desired, the processing time, the temperature and other process parameters are adjusted accordingly. To obtain about a five-fold increase of surface area it has been found that the current density should be approximately 0.1 to 10 amps per square inch, the temperature should be desirably 20° to 80°C, and the concentration of chloride in the aqueous solution should be about 0.1 to 20%. Desirably, the etching process is completed in from one-half to two minutes and the aluminum sheet is thereafter removed from the etching bath and introduced into the cathodic cleaning bath.

During the graining step, it has been found that impurities form on the surface of the aluminum, including aluminum hydroxide, various chloride compounds and other contaminants introduced with the raw aluminum sheet. It is, therefore, desirable to subject the aluminum sheet, prior to the graining step, to a degreasing in order to remove organic impurities such as greases and oils and the greater part of any inorganic contaminants on the surface of the aluminum.

Preferably, the graining is carried out in the presence of a solution of hydrochloric acid having a concentration of from 0.5 to 5%. The temperature of the solution is preferably in the range of from 20° to 50°C. The current impressed upon the sheet in the graining operation is desirably an alternating current. However, it is possible to use a direct current as well. Other electrolytes which can be used are sodium chloride, potassium chloride, and lithium chloride.

The cathodic cleaning step achieves the removal of the chemicals which are formed during the graining step. The cathodic cleaning takes place in a solution of sulfuric acid which is desirably in a concentration of from 10 to 50 weight %. The solution is maintained at a temperature of from 20° to 80°C. The current which is impressed on the aluminum sheet, passing through the cathodic cleaning solution, is desirably from 0.1 to 10 amperes per square inch and more preferably is from 1 to 5 amperes per square inch. Depending on these several parameters, the cathodic cleaning can be completed in from ½ to 2 minutes and usually less than 1 minute is required to completely remove the contaminants from the surface of the aluminum. It is possible to use either direct current or alternating current in the cathodic cleaning step; however, it has been found that best results are obtained if direct current is used.

After the cathodic cleaning, the surface of the aluminum sheet is clean but it is still relatively soft. The sheet is then passed from the cathodic cleaning bath to an anodizing bath which contains a solution of sulfuric acid having a weight concentration of desirably from 8 to 22%. The preferred concentration of sulfuric acid is from 10 to 20 weight %. The temperature of the anodizing bath is from 20° to 80°C and best results are obtained if the temperature is from 20° to 40°C. Best results are also obtained if a direct current is impressed on the aluminum sheet in the anodizing bath and the current density should be in the range of from 1 to 100 amperes per square foot. The preferred current density is from 10 to 50 amperes per square foot. The anodizing step can be completed in from ½ to 3 minutes but usually this step takes no longer than from 1 to 2 minutes.

A most efficient operation is obtained in accordance with the process shown in the drawing. The drawing depicts a schematic process showing the three stages of treatment of the aluminum sheet.

In the drawing reference numeral 10 refers to a web of aluminum which moves from left to right through the three electrolytic baths discussed below. The aluminum web passes over rollers 12 and is moved by means not shown in the drawings. Numerous rollers and switchbacks can be used in order to control the residence time of the web in each of the electrolytic baths.

Reference numeral 14 refers to an electrolytic graining bath containing a solution of hydrochloric acid 16 and having electrode 18 placed in confrontation with the aluminum web 10. Reference numeral 20 refers to a cathodic cleaning bath containing a solution of sulfuric acid 21 and reference numeral 22 refers to an electrode in confrontation with aluminum web 10. Likewise, reference numeral 30 refers to a tank containing an anodizing solution of sulfuric acid 31 and reference numeral 32 refers to an electrode in confrontation with aluminum web 10. Reference numeral 40 refers to a source of alternating current which impresses an alternating current on graining electrode 18. Reference numeral 50 refers to a source of direct current which imposes a direct current on the cathodic cleaning and anodizing electrodes.

What is claimed is:

1. A method of producing an aluminum base sheet suitable for a printing plate, which comprises:

a. First graining the surface of said aluminum base sheet by treatment for from one-half to two minutes in an aqueous electrolytic solution containing from 0.1 to 20 per cent of an electrolyte selected from the group consisting of HCl, NaCl, LiCl and KCl, with an alternating voltage providing a current density of from about 0.1 to 10 amps per square inch, at a temperature of from 20° to 95°C., to increase the surface area of said aluminum sheet by about 500%; and b. Then cleaning the said grained aluminum sheet by treatment thereof for from ½ to 2 minutes in an aqueous solution of sulfuric acid of concentration of from about 10 to 50 weight percent, with a direct voltage providing a current density of from about 0.1 to about 10 amps per square inch, at a temperature of from about 20° to 80°C, wherein said aluminum sheet is the cathodic electrode; and c. Then anodizing the said cleaned aluminum sheet by treatment thereof in an aqueous solution of sulfuric acid having a concentration of from 8 to 22 weight percent for from ½ to 3 minutes, with a direct voltage providing a current density of from 1 to 100 amperes per square foot, at a temperature of from 20° to 80°C wherein said aluminum sheet is the anodic electrode, to yield a grained, cleaned and anodized aluminum base sheet suitable for a printing plate.

2. The method of claim 1 wherein in step (a), the electrolyte is hydrochloric acid.

3. The method of claim 1 wherein in step (c), the sulfuric acid is present in a concentration of from 10 to 20 weight percent.

4. The method of claim 1 wherein in step (a), the temperature is maintained at from 20° to 50°C.

5. The method of claim 1, wherein in step (c), the temperature is maintained at from 20° to 40°C.

* * * * *